US012803350B2

(12) United States Patent
Haddad et al.

(10) Patent No.: US 12,803,350 B2
(45) Date of Patent: Nov. 17, 2026

(54) ELECTRIC MACHINE PERMANENT MAGNET RETENTION

(71) Applicant: FCA US LLC, Auburn Hills, MI (US)

(72) Inventors: Reemon Z. S. Haddad, Rochester Hills, MI (US); Dhafar Al-Ani, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 275 days.

(21) Appl. No.: 18/426,413

(22) Filed: Jan. 30, 2024

(65) Prior Publication Data

US 2025/0246953 A1 Jul. 31, 2025

(51) Int. Cl.

| | |
|---|---|
| ***H02K 1/27*** | (2022.01) |
| ***H02K 1/276*** | (2022.01) |
| ***H02K 15/03*** | (2006.01) |

(52) U.S. Cl.

CPC ............ *H02K 1/276* (2013.01); *H02K 15/03* (2013.01); *H02K 2215/00* (2021.08)

(58) Field of Classification Search

CPC ..... H02K 1/276; H02K 15/03; H02K 2215/00

See application file for complete search history.

(56) References Cited

U.S. PATENT DOCUMENTS

| | | | | |
|---|---|---|---|---|
| 5,117,553 | A | 6/1992 | Kliman | |
| 9,621,001 | B2 | 4/2017 | Kaiser et al. | |
| 2018/0248427 | A1* | 8/2018 | Kano | H02K 1/2766 |
| 2020/0014260 | A1* | 1/2020 | Arai | H02K 1/28 |

FOREIGN PATENT DOCUMENTS

| | | |
|---|---|---|
| CN | 104578495 A | 4/2015 |

* cited by examiner

*Primary Examiner* — Thomas Truong

(74) *Attorney, Agent, or Firm* — Jeremy J. Klobucar

(57) ABSTRACT

A rotor assembly includes a plurality of rotor laminations arranged in a stacked configuration, and a plurality of apertures formed in each of the rotor laminations, wherein the plurality of apertures of the plurality of rotor laminations are aligned to form a plurality of passages in the stacked configuration. A permanent magnet is inserted into each passage. At least one deformable locator extends into each aperture and is configured to be mechanically deformed into contact with a permanent magnet inserted into the aperture to thereby fixedly secure the permanent magnet within the stacked configuration.

16 Claims, 4 Drawing Sheets

ELECTRIC MACHINE PERMANENT MAGNET RETENTION

FIELD

The present application generally relates to electric machines and, more particularly, to an electric machine with improved permanent magnet retention.

BACKGROUND

Electric machines, such as electric traction motors, often include permanent magnets to generate torque. Permanent magnet retention is a critical aspect of electric motor design that directly impacts its performance, reliability, and longevity. Proper magnet retention ensures that the permanent magnets remain securely in their designated positions in a precise alignment that optimizes the magnetic field distribution to improve performance, maximize torque, and reduce overall losses for high efficiency. Known retention solutions include adhesives, injection molding around the magnets, and springs. However, such solutions may be costly, complex, difficult to repair, vulnerable to extreme temperatures, and may degrade over time. Accordingly, while such systems work well for their intended purpose, there exists an opportunity for improvement in the relevant art.

SUMMARY

According to one example aspect of the invention, a rotor assembly for an electric machine is provided. In one exemplary implementation, the rotor assembly includes a plurality of rotor laminations arranged in a stacked configuration, and a plurality of apertures formed in each of the rotor laminations, wherein the plurality of apertures of the plurality of rotor laminations are aligned to form a plurality of passages in the stacked configuration. A permanent magnet is inserted into each passage. At least one deformable locator extends into each aperture and is configured to be mechanically deformed into contact with a permanent magnet inserted into the aperture to thereby fixedly secure the permanent magnet within the stacked configuration.

In addition to the foregoing, the described rotor assembly may include one or more of the following features: wherein the at least one deformable locator includes a first deformable locator and a second deformable locator extending to each aperture, the first and second deformable locators configured to secure the permanent magnet therebetween; wherein each deformable locator includes a main body having a connection edge coupled to the rotor lamination; wherein at least one notch is formed between the at least one deformable locator and the rotor lamination, the at least one notch configured to facilitate and control deformation of the deformable locator into contact with the permanent magnet; wherein the at least one notch comprises opposed first and second notches formed along the connection edge; and wherein the first and second notches are each V-shaped.

In addition to the foregoing, the described rotor assembly may include one or more of the following features: wherein the at least one deformable locator further includes a contact edge initially oriented at a chamfer angle relative to the permanent magnet, and wherein a deformation tool is utilized to forcibly move and deform the at least one deformable locator toward the permanent magnet such that the contact edge contacts the permanent magnet; wherein the at least one deformable locator further includes a contact edge initially oriented at a chamfer angle relative to the permanent magnet that occupies a portion of the space intended for the permanent magnet, wherein when the permanent magnet is inserted into the aperture, the permanent magnet engages the contact edge and forces and deforms the deformable locator outward to allow the permanent magnet to be fully inserted into the aperture while fixedly securing the permanent magnet therein; and a stress relief aperture formed along the connection edge and configured to provide stress relief as the deformable locator is deformed into contact with the permanent magnet.

According to another example aspect of the invention, a method of manufacturing a rotor assembly for an electric machine is provided. In one implementation, the method includes providing a plurality of rotor laminations, forming each rotor lamination of the plurality of rotor laminations with a plurality of apertures and at least one deformable locator extending into each aperture, and arranging the rotor laminations of the plurality of rotor laminations in a stacked configuration with the plurality of apertures of each stator lamination aligned, to thereby form a plurality of passages in the stacked configuration. The method further includes inserting a permanent magnet in each passage of the plurality of passages and mechanically deforming each deformable locator into contact with the permanent magnet inserted into the passage to thereby fixedly secure the permanent magnet within the stacked configuration.

In addition to the foregoing, the described method may include one or more of the following features: wherein the at least one deformable locator includes a first deformable locator and a second deformable locator extending to each aperture, the method further including mechanically deforming the first and second deformable locators to secure the permanent magnet therebetween; wherein each deformable locator is formed with a main body having a connection edge coupled to the rotor lamination; and forming at least one notch between the at least one deformable locator and the rotor lamination, the at least one notch configured to facilitate and control deformation of the deformable locator into contact with the permanent magnet.

In addition to the foregoing, the described method may include one or more of the following features: wherein the at least one notch comprises opposed first and second notches formed along the connection edge; wherein the first and second notches are each V-shaped; and wherein the at least one deformable locator further includes a contact edge initially oriented at a chamfer angle relative to the permanent magnet, the method further including forcibly moving and deforming, with a deformation tool, the at least one deformable locator toward the permanent magnet such that the contact edge contacts the permanent magnet.

In addition to the foregoing, the described method may include one or more of the following features: wherein the at least one deformable locator further includes a contact edge initially oriented at a chamfer angle relative to the permanent magnet that occupies a portion of the space intended for the permanent magnet, the method further including inserting the permanent magnet into the aperture such that the permanent magnet engages the contact edge and forces and deforms the deformable locator outward to allow the permanent magnet to be fully inserted into the aperture while fixedly securing the permanent magnet therein; and forming a stress relief aperture along the connection edge, the stress relief aperture configured to provide stress relief as the deformable locator is deformed into contact with the permanent magnet.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
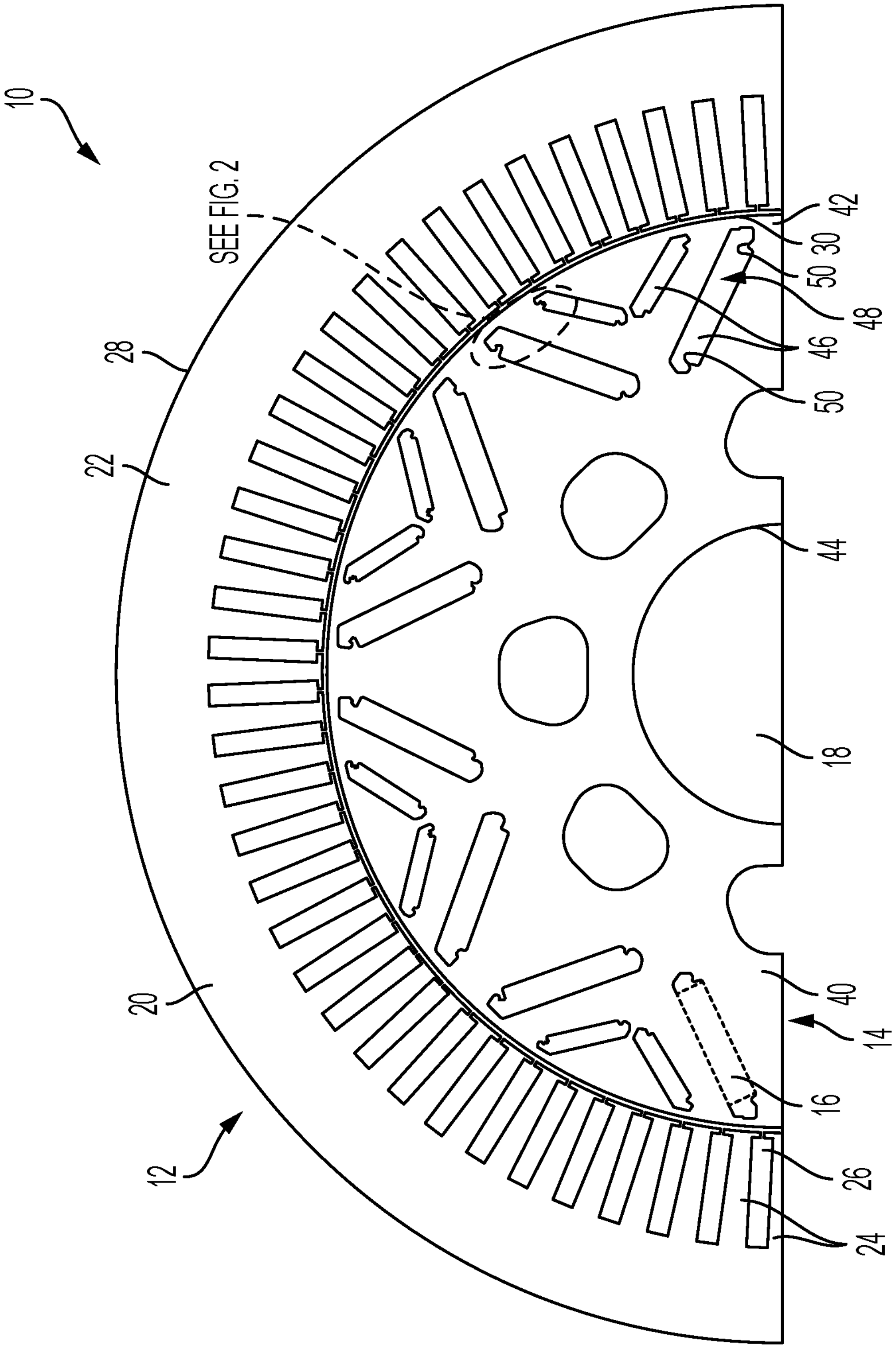
FIG. 1 is a cross-sectional view of a portion of an example electric motor for an electric vehicle, in accordance with the principles of the present application.

As previously described, permanent magnet retention is a critical aspect of electric machine design that ensures the electric machine operates efficiently, quietly, and reliably throughout its operational life. Known retention methods often require additional materials, such as adhesives or injection molding compounds, which increase cost and complexity and may degrade over time. Accordingly, described herein are alternative permanent magnet retention systems and methods that utilize deformable guides or locators to provide a mechanical retention to fix the permanent magnet location and eliminate the need for other retention methods such as adhesives or injection molding. The shape of the locators enables deformation during the assembly process, and the deformation ensures the application of sufficient force to firmly fix the magnets in place, thereby preventing unintended movement during operation of the electric machine.

In this way, the stator or rotor of the electric machine includes low stress deformable locators to mechanically fix the permanent magnet in a desired location. In general, for each permanent magnet, two deformable locators are utilized. A single locator can be deformed or both locators can be deformed to provide permanent magnet retention. It will be appreciated that not every rotor lamination across the stack length need the deformable locators. The number of electric steel laminations that are needed to have the modified deformable locators may be optimized based on the electric machine design, stack length, permanent magnet size, and/or various other factors.

In one example, the deformable locator includes an inner notch, an outer notch, and a chamfer on an inner locator side. The inner and outer notches are configured to control the locator deformation without causing damage to the rotor's electric steel laminations, while the chamfer on the inner locator side ensures the largest possible contact area between the locator and the permanent magnet. Moreover, the deformable locator enhances retention capability by uniformly distributing contact forces. In another example, in addition to the deformable locator, a central notch is provided in the center of the of deformable locator and is configured to provide stress relief during the deformation process. The shape, size, and location of this additional notch may be optimized to provide a desired deformation performance.

Additionally, various methods may be employed to deform the magnet locators. In one example, after the permanent magnet is inserted into the electric machine, and a deformation tool is placed within each permanent magnet air pocket. By rotating the tool while contacting the locator, the locators will deform into the magnet, effectively securing and fixing the location of the permanent magnets. In another example, the permanent magnets are themselves utilized as a deformation tool. During axial insertion into the electric steel lamination core, the magnet contacts the locator (e.g., interference fit). As the magnet is inserted, the magnet deforms the locator(s), but remains in contact therewith to fix the permanent magnet into the desired position. For both methods, a chamfer angle of the deformable locator is in the opposite direction of the deformation direction.

Referring now to FIG. 1, a portion of an example electric machine is illustrated and generally identified at reference numeral 10. In the example embodiments, the electric machine 10 is described as an electric traction motor for an electric vehicle, but it will be appreciated that the features described herein may be applied to various permanent magnet electric machines. For example, electric machine 10 may be an interior permanent magnet machine, a surface mounted permanent magnet machine, a permanent magnet assist, axial flux, etc.

In the illustrated example, the electric traction motor 10 generally includes a stator assembly 12 operably associated with a rotor assembly 14 having a plurality of permanent magnets 16. In general, the stator assembly 12 receives electrical power to produce a magnetic field, which interacts with a magnetic field of the rotor assembly 14 to produce mechanical power to a shaft 18.

In the example embodiment, the stator assembly 12 is formed from a plurality of individual annular stator laminations 20 (only one shown). The stator laminations 20 are stacked one on top of the other to a length known as the stack length, which determines the torque and power output of the electric machine 10. The stator laminations 20 are coupled together, for example, by gluing, interlocking, welding, or other suitable joining technique. The number of stator laminations 20 of the stack length can be based on design considerations and, as such, stator assembly 12 may have any suitable number of stator laminations 20.

In the illustrated example, each stator lamination 20 is fabricated from a magnetic steel in a punching die, laser cut, 3D printing, etc. (not shown) to produce a generally annular component (only half shown) having a back iron 22 with a plurality radially aligned teeth 24 extending radially inward from the back iron 22. The stator teeth 24 define slots 26 therebetween through which coil windings (not shown) are wound. The back iron 22 defines an outer diameter 28, and the distal end of each stator tooth 24 defines an inner diameter edge 30.

In the example embodiment, the rotor assembly 14 is formed from a plurality of individual circular rotor laminations 40 (only one shown). The rotor laminations 40 are stacked one on top of the other to a stack length, which further determines the torque and power output of the electric machine 10. The rotor laminations 40 are coupled together, for example, by gluing, interlocking, welding, or other suitable joining technique. The number of rotor laminations 40 of the stack length can be based on design considerations and, as such, rotor assembly 14 may have any suitable number of rotor laminations 40.

In the illustrated example, each rotor lamination 40 is fabricated from a magnetic steel in a punching die, laser cut, 3D printing, etc. (not shown) to produce a generally circular component (only half shown) having an outer diameter 42, an inner diameter 44, and a plurality of slots or apertures 46 for receiving one or more of the permanent magnets 16. The outer diameter 42 faces the stator inner diameter edge 30, and the inner diameter 44 receives and is mechanically coupled (e.g., splined) to the shaft 18. During assembly, the rotor laminations 40 are stacked such that the apertures 46 are aligned to define a passage 48 to receive the permanent magnets 16 through the stacked configuration.

Figure 3:
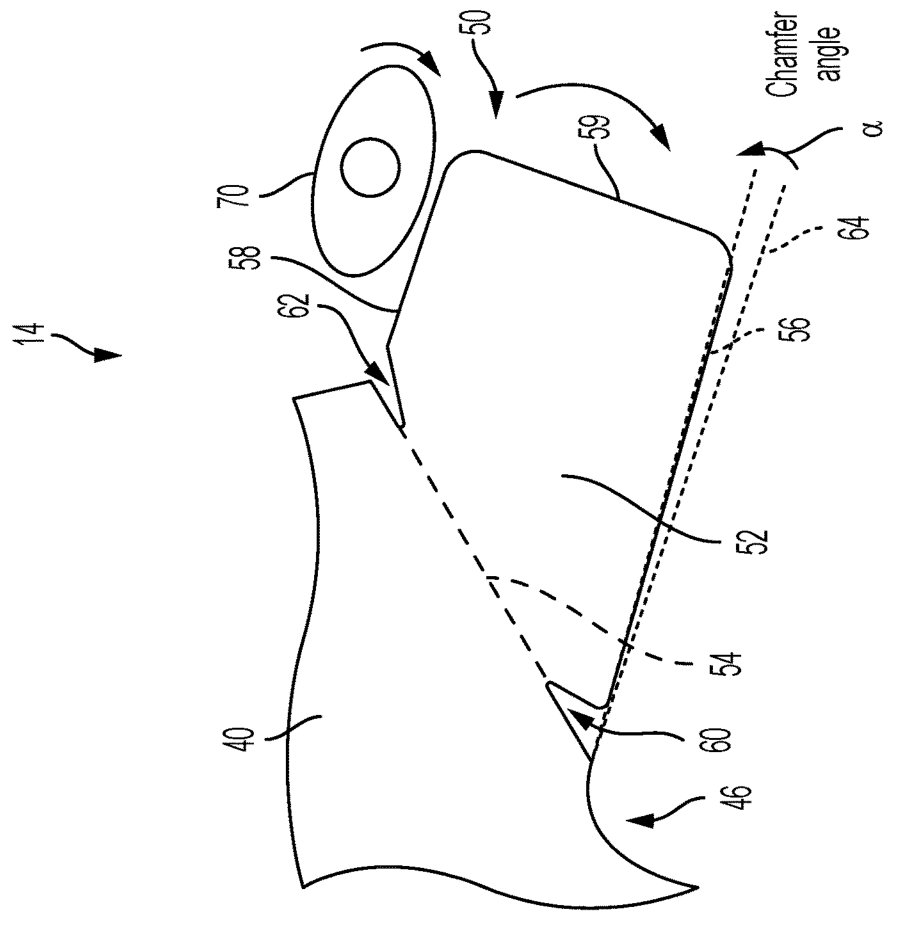
FIG. 3 is an enlarged view of a portion of the rotor assembly of FIG. 2 illustrating an example deformable locator, in accordance with the principles of the present application.
Figure 2:
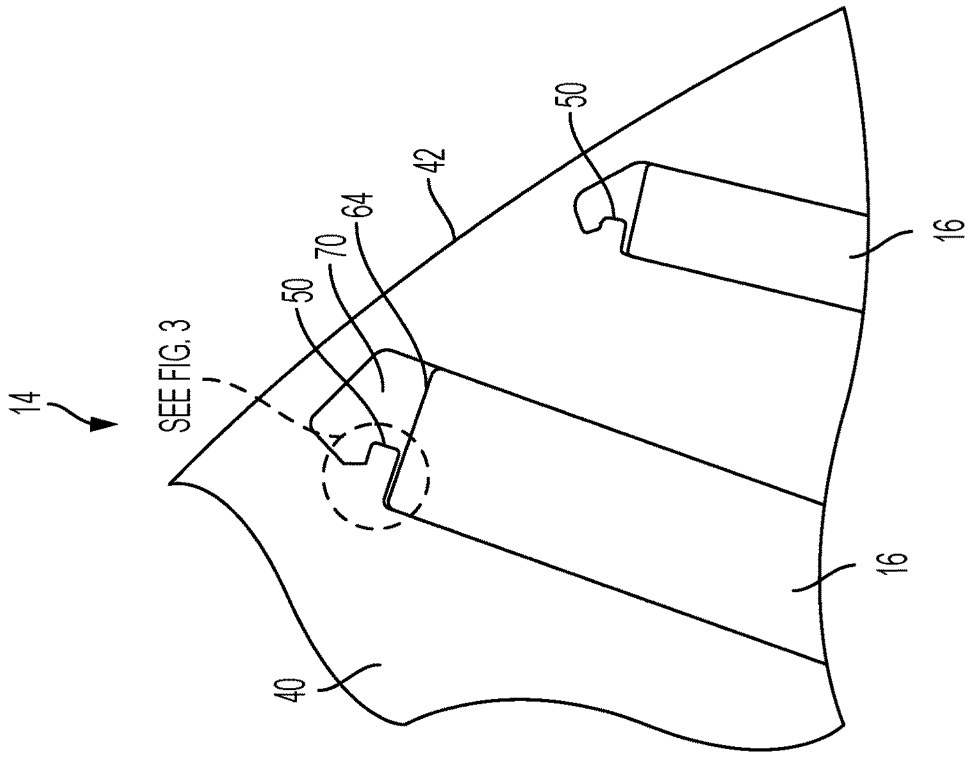
FIG. 2 is an enlarged view of a portion of the rotor assembly shown in FIG. 1, in accordance with the principles of the present application.

With additional reference to FIGS. 2 and 3, one or more of the rotor laminations 40 include one or more deformable locators 50 configured to guide and locate the permanent magnet 16 into each individual aperture 46. As shown, the deformable locator 50 extends into the aperture 46. Once the permanent magnet 16 is inserted into the aperture 46, the one or more deformable locators 50 are mechanically manipulated to fix or lock the permanent magnet 16 in the desired position, as shown in FIG. 2. In this way, fixing of the permanent magnet 16 in the rotor lamination stack does not require adhesives, injection molding, springs, or other components.

As shown in FIG. 3, the deformable locator 50 is a tab-like feature coupled to and extending from the rotor lamination 40 into the aperture 46. In the example embodiment, the deformable locator 50 is integrally formed with the rotor lamination 40, but it will be appreciated that locator 50 may be a separate component subsequently coupled (e.g., welded) to the rotor lamination 40. In the example embodiment, the deformable locator 50 generally includes a main body 52 with a connection side or edge 54, a magnet contact side or edge 56, a tool side or edge 58, and a distal side or edge 59.

The connection edge 54 is coupled to the rotor lamination 40 and extends between the contact edge 56 and the tool edge 58. As shown, only a portion of the length of the connection edge 54 is coupled to the rotor lamination 40 such that a first or inner notch 60 and a second or outer notch 62 are formed=between the locator 50 and the rotor lamination 40 at the opposite ends of the connection edge 54. The inner and outer notches 60, 62 are configured to allow and control movement of the locator 50 toward the permanent magnet 16 such that the contact edge 56 contacts an edge 64 (or other portion) of the permanent magnet 16 to fixedly secure the magnet within the aligned apertures 46 of the stack of rotor laminations 40. In the example embodiment, the notches 60, 62 are integrally formed during the stamping process of laminations 40, but it will be appreciated they may be formed in other processes (e.g., machining).

As shown in FIG. 2, the deformable locator 50 is initially oriented with the contact edge 56 at a chamfer angle 'α' relative to the permanent magnet edge 64. The angle will depend on various design factors such as magnet size, notch size, the deformation angle to provide maximum contact surface between magnet 16 and the deformed locator 50. In the example embodiment, a deformation tool 70 is inserted into an air gap 72 of aperture 46 and subsequently contacts the tool edge 58 to forcibly move and deform the locator 50 towards and into contact with the permanent magnet 16. As illustrated, the contact edge 56 has a relatively long length to ensure a large contact area with the permanent magnet 16 for securing the magnet within aperture 46. In the illustrated example, the deformation tool 70 is robotically controlled and rotated toward the tool edge 58 to deform the locator 50 into contact with the permanent magnet 16, as shown in FIG. 2. However, it will be appreciated that various other types of tools may be used to perform the deformation operation described herein.

Figure 4:
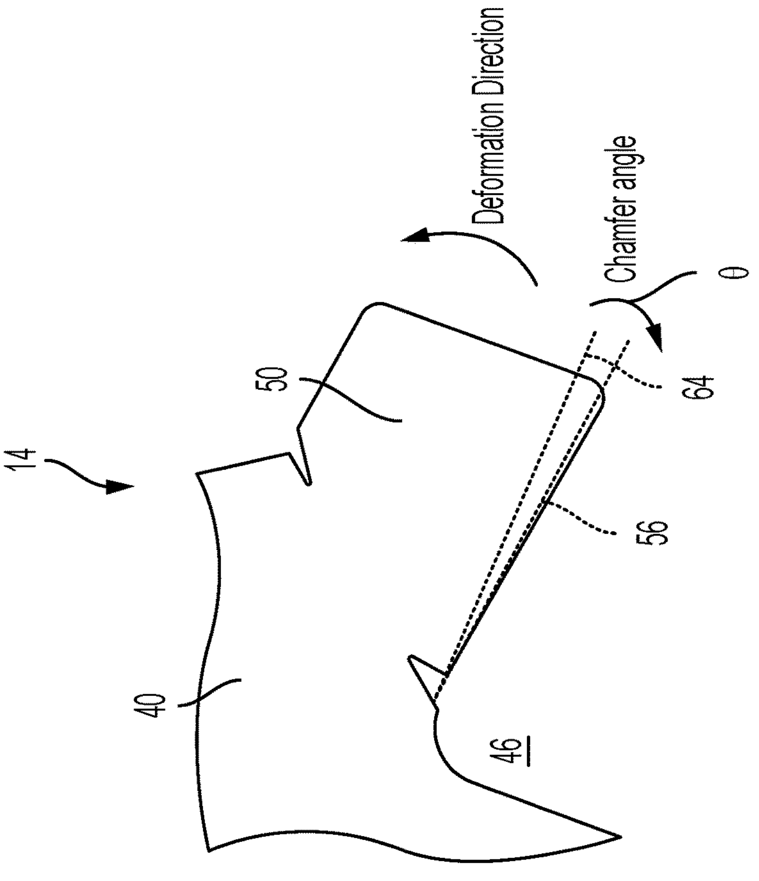
FIG. 4 illustrates an alternative embodiment of the deformable locator shown in FIG. 3, in accordance with the principles of the present application.

With additional reference to FIG. 4, an alternative method of securing the permanent magnet 16 within aperture 46 via the deformable locator 50 is illustrated. In the example embodiment, the deformable locator 50 is initially oriented with the contact edge 56 oriented at a chamfer angle 'θ' relative to the final location of the permanent magnet edge 64 (shown as a dashed line). In this initial orientation, the contact edge 56 occupies a portion of the space intended for the permanent magnet 16. During assembly, as the permanent magnet 16 is inserted into the aperture 46 with a sufficiently high force, the magnet engages the contact edge 56 (e.g., interference fit) and pushes/deforms the locator 50 outward to allow the permanent magnet 16 to be fully inserted into the aperture 46. However, the contact edge 56 maintains contact with the magnet edge 64 to thereby fixedly secure the magnet 16 in the desired location within the aperture 46. In some examples, the permanent magnets 16 may be tapered such that a smaller end is inserted into the aperture 46 with little or no interference with locator 50. As the tapered magnet widens along its length, during insertion, the magnet comes into contact with the locator 50 and deforms it outward to secure the magnet within aperture 46.

Figure 5:
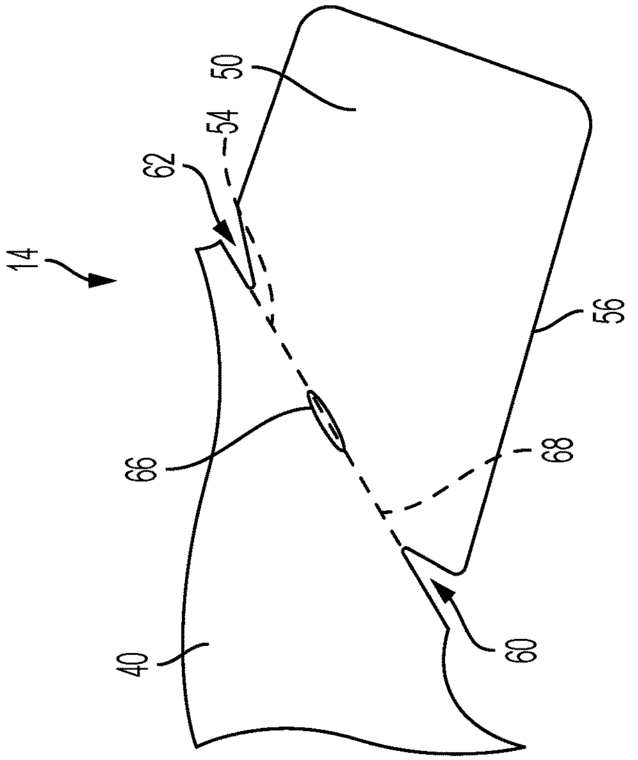
FIG. 5 is a view of the deformable locator of FIG. 3 with an example stress relief area, in accordance with the principles of the present application.

With reference now to FIG. 5, the deformable locator 50 may also be formed with a stress relief aperture 66 located on the connection edge 54 between the inner and outer notches 60, 62. The stress relief aperture 66 is an additional notch configured to provide stress relief as the locator 50 is deformed into contact with the permanent magnet 16, for example to prevent fracture and dislocation of the locator 50 from the rotor lamination 40. In the example embodiment, the stress relief aperture 66 is located centrally (e.g., equidistant) between the inner and outer notches 60, 62 generally along a demarcation line 68 between the locator 50 and the rotor lamination 40. In the example illustration, the stress relief aperture 66 is generally elliptical with a longitudinal axis that is parallel to or substantially parallel to the demarcation line 68. However, it will be appreciated that the stress relief aperture 66 may have any suitable size, shape, and location depending on the rotor lamination material/design and desired magnitude of stress relief.

Figure 6:
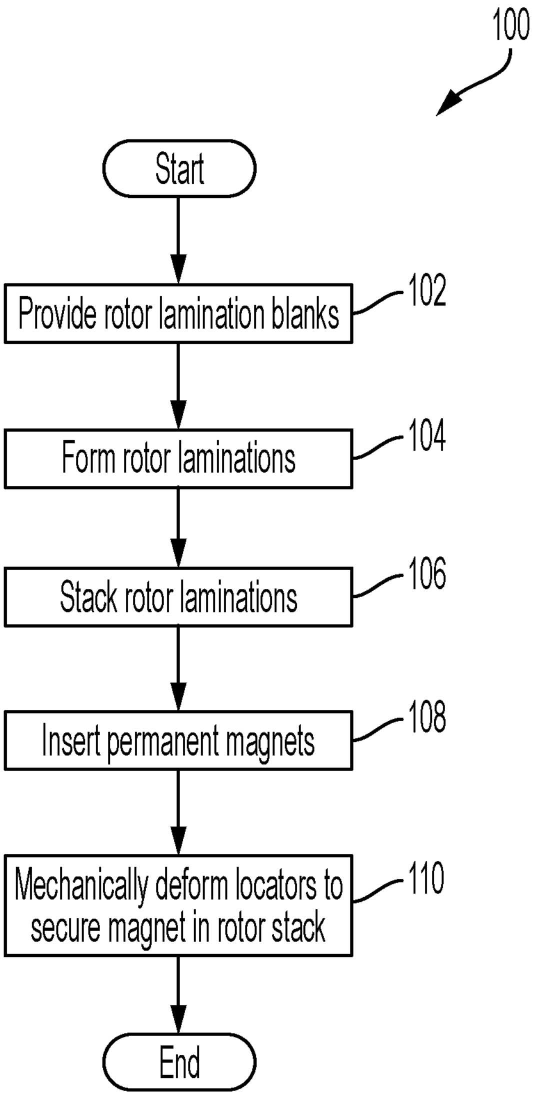
FIG. 6 illustrates an example method of manufacturing a rotor assembly that may be utilized in the electric motor of FIG. 1, in accordance with the principles of the present application.

FIG. 6 illustrates an example method 100 of manufacturing rotor assembly 14. The method begins at step 102 where a plurality of rotor lamination blanks is provided. At step 104, each rotor lamination blank is processed and formed with outer diameter 42, inner diameter 44, and apertures 46 to produce a plurality of rotor laminations 40. At least a portion of the rotor laminations 40 are also each formed with at least one of the deformable locators 50 (FIGS. 3-5) extending into each aperture 46. Optionally, the rotor laminations 40 are formed with one or more of the stress relief apertures 66. In the example embodiment, the rotor laminations 40 are formed in a die press operation.

At step 106, the rotor laminations 40 are stacked and coupled with apertures 46 aligned to form a stacked configuration. At step 108, permanent magnets 16 are inserted into the aligned apertures 46 of the stacked configuration. At step 110, the deformable locator(s) 50 are mechanically deformed into contact with the permanent magnets 16 to fixedly secure the magnets within the rotor assembly 14. This may be performed by deforming the locators 50 into contact with the permanent magnets 16 (e.g., FIG. 3) or deforming the locators 50 outward during the insertion of the permanent magnets 16 (e.g., FIG. 4).

Described herein are systems and methods for manufacturing electric machines, such as electric traction motors, with an improved rotor assembly design to improve permanent magnet retention and reduce or eliminate NVH. The rotor is assembled from a plurality of magnetic steel laminations each formed with one or more deformable locators extending into apertures to receive a permanent magnet. The locators include one or more notches to facilitate mechanical deformation and are mechanically deformed by a tool or during magnet insertion to fixedly secure the permanent magnet within the rotor aperture. Advantageously, the rotor assembly does not require additional and costly retention methods such as adhesives, injection molding, springs, or the like, thereby reducing cost and complexity.

The example embodiments of the invention have been explained by way of example with reference to a rotor of an electric machine. It will be appreciated, however, that the designs described here are also suitable for a stator of an electric machine.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A rotor assembly for an electric machine, the rotor assembly comprising:

a plurality of rotor laminations arranged in a stacked configuration;

a plurality of apertures formed in each of the rotor laminations, wherein the plurality of apertures of the plurality of rotor laminations are aligned to form a plurality of passages in the stacked configuration;

a permanent magnet inserted into each passage; and at least one deformable locator extending into each aperture and configured to be mechanically deformed into contact with the permanent magnet inserted into the aperture to thereby fixedly secure the permanent magnet within the stacked configuration, wherein each deformable locator includes a main body having a connection edge coupled to the rotor lamination, the connection edge extending along a demarcation line that separates the rotor lamination and the deformable locator, and wherein a stress relief aperture is formed along the demarcation line and configured to provide stress relief as the deformable locator is deformed into contact with the permanent magnet.

2. The rotor assembly of claim 1, wherein the at least one deformable locator includes a first deformable locator and a second deformable locator extending into each aperture, the first and second deformable locators configured to secure the permanent magnet therebetween.

3. The rotor assembly of claim 1, wherein at least one notch is formed between the at least one deformable locator and the rotor lamination at the demarcation line, the at least one notch configured to facilitate and control deformation of the deformable locator into contact with the permanent magnet.

4. The rotor assembly of claim 3, wherein the at least one notch comprises opposed first and second notches formed at opposite ends of the demarcation line.

5. The rotor assembly of claim 4, wherein the first and second notches are each V-shaped with an acute angle.

6. The rotor assembly of claim 4, wherein the stress relief aperture is located centrally between the first and second notches.

7. The rotor assembly of claim 1, wherein the at least one deformable locator further includes a contact edge initially oriented at a chamfer angle relative to the permanent magnet, wherein a deformation tool is utilized to forcibly move and deform the at least one deformable locator toward the permanent magnet such that the contact edge contacts the permanent magnet.

8. A rotor assembly for an electric machine, the rotor assembly comprising:

a plurality of rotor laminations arranged in a stacked configuration;

a plurality of apertures formed in each of the rotor laminations, wherein the plurality of apertures of the plurality of rotor laminations are aligned to form a plurality of passages in the stacked configuration;

a permanent magnet inserted into each passage; and at least one deformable locator extending into each aperture and configured to be mechanically deformed into contact with the permanent magnet inserted into the aperture to thereby fixedly secure the permanent magnet within the stacked configuration, wherein each deformable locator includes a main body having a connection edge coupled to the rotor lamination, the connection edge extending along a demarcation line that separates the rotor lamination and the deformable locator, wherein the at least one deformable locator further includes a contact edge initially oriented at a chamfer angle relative to the permanent magnet that occupies a portion of the space intended for the permanent magnet, wherein when the permanent magnet is inserted into the aperture, the permanent magnet engages the contact edge and forces and deforms the deformable locator outward to allow the permanent magnet to be fully inserted into the aperture while fixedly securing the permanent magnet therein, and wherein a stress relief aperture is formed along the demarcation line and configured to provide stress relief as the deformable locator is deformed by contact with the permanent magnet.

9. A method of manufacturing a rotor assembly for an electric machine, the method comprising:

providing a plurality of rotor laminations;

forming each rotor lamination of the plurality of rotor laminations with a plurality of apertures and at least one deformable locator extending into each aperture;

arranging the rotor laminations of the plurality of rotor laminations in a stacked configuration with the plurality of apertures of each stator lamination aligned, to thereby form a plurality of passages in the stacked configuration;

inserting a permanent magnet in each passage of the plurality of passages; and mechanically deforming each deformable locator into contact with the permanent magnet inserted into the passage to thereby fixedly secure the permanent magnet within the stacked configuration, wherein each deformable locator includes a main body having a connection edge coupled to the rotor lamination, the connection edge extending along a demarcation line that separates the rotor lamination and the deformable locator, and wherein a stress relief aperture is formed along the demarcation line and configured to provide stress relief as the deformable locator is deformed into contact with the permanent magnet.

10. The method of claim 9, wherein the at least one deformable locator includes a first deformable locator and a second deformable locator extending into each aperture, the method further comprising:

mechanically deforming the first and second deformable locators to secure the permanent magnet therebetween.

11. The method of claim 9, further comprising forming at least one notch between the at least one deformable locator and the rotor lamination at the demarcation line, the at least one notch configured to facilitate and control deformation of the deformable locator into contact with the permanent magnet.

12. The method of claim 11, wherein the at least one notch comprises opposed first and second notches formed at the opposite ends of the demarcation line.

13. The method of claim 12, wherein the first and second notches are each V-shaped with an acute angle.

14. The method of claim 12, wherein the stress relief aperture is formed centrally between the first and second notches.

15. The method of claim 9, wherein the at least one deformable locator further includes a contact edge initially oriented at a chamfer angle relative to the permanent magnet, the method further comprising:

forcibly moving and deforming, with a deformation tool, the at least one deformable locator toward the permanent magnet such that the contact edge contacts the permanent magnet.

16. The method of claim 9, wherein the at least one deformable locator further includes a contact edge initially oriented at a chamfer angle relative to the permanent magnet that occupies a portion of the space intended for the permanent magnet, the method further comprising:

inserting the permanent magnet into the aperture such that the permanent magnet engages the contact edge and forces and deforms the deformable locator outward to allow the permanent magnet to be fully inserted into the aperture while fixedly securing the permanent magnet therein.

* * * * *